(12) United States Patent
Ikemoto et al.

(10) Patent No.: US 6,413,201 B1
(45) Date of Patent: Jul. 2, 2002

(54) RUBBER COMPOSITIONS AND HOSES

(75) Inventors: Ayumu Ikemoto, Komaki; Eiichi Daikai, Inuyama; Koji Senda, Niwa-gun, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 64 days.

(21) Appl. No.: 09/627,114

(22) Filed: Jul. 27, 2000

(30) Foreign Application Priority Data

Aug. 3, 1999 (JP) ............................................ 11-219885

(51) Int. Cl.⁷ .................................................. C08F 8/00
(52) U.S. Cl. ..................................... 515/331.7; 525/387
(58) Field of Search ............................... 525/731.7, 387

(56) References Cited

U.S. PATENT DOCUMENTS 5,112,660 A    5/1992    Saito et al. ................. 428/36.8

FOREIGN PATENT DOCUMENTS

JP    11-035748    2/1999

OTHER PUBLICATIONS

Patent Abstracts of Japan; vol. 1995, No. 10; Nov. 30, 1995 JP 07 179682; Jul. 18, 1995.

Patent Abstracts of Japan; vol. 014, No. 030; Jan. 19, 1990 JP 01 268743; Oct. 26, 1989.

Patent Abstracts of Japan; vol. 018, No. 055, Jan. 28, 1994 JP 05 278165; Oct. 26, 1993.

*Primary Examiner*—Bernard Lipman
(74) *Attorney, Agent, or Firm*—Jacobson Holman, PLLC

(57) ABSTRACT

A peroxide cure system rubber composition comprises EPDM having a high iodine value and an appropriate ethylene proportion, and preferably at least quinoline as an antioxidant, and is particularly suitable for use in making a hose in a cooling system for an automobile engine. The hose is highly resistant to hot air aging and cracking, though the composition does not contain zinc.

13 Claims, 1 Drawing Sheet

RUBBER COMPOSITIONS AND HOSES

BACKGROUND OF THE INVENTION

1. Field of the Invention

This invention relates to a rubber composition and a hose. More particularly, it relates to a zinc-free peroxide-cure system rubber composition comprising EPDM as a base material, and a hose formed therefrom and used in, for example, a cooling system for an automobile engine.

2. Description of the Related Art

A hose having an inner wall layer formed from a vulcanized rubber composition consisting mainly of EPDM is often used in a cooling system for an automobile engine, for example, with a radiator, or heater. The vulcanization of any such composition is typically carried out by using a peroxide cure system or sulfur cure system. For sulfur vulcanization, it is essential to use zinc oxide (zinc white) as an accelerator activator. Zinc oxide is understood to play an important role in peroxide vulcanization, too, since it acts as a radical scavenger to keep the composition resistant to heat during hot air aging.

Zinc oxide stays in the form of a zinc salt in a rubber composition after this composition has been vulcanized. It is, however, known that the zinc salt gradually migrates to the surface of the vulcanized product, such as a hose, dissolves into any coolant in the hose and reacts with phosphoric acid in the coolant to form an insoluble compound. The insoluble compound may cause various problems. It may eventually block the hose if it is deposited on its inner wall surface, or if it is deposited on a seal between the hose and any pipe connected therewith, it may cause the coolant to leak out therethrough.

Those problems are avoidable if there is a rubber composition not causing any such dissolution of zinc. They can, however, be overcome more easily and effectively if there is available a zinc-free composition not containing any zinc oxide. No sulfur-vulcanizable composition can, however, be zinc-free, since its vulcanization essentially requires zinc oxide as an activator. The zinc-free composition, therefore, relates to a peroxide cure system EPDM composition used for engine cooling hoses.

Zinc oxide plays an important role as a radical scavenger in a peroxide cure system EPDM composition as stated before, and it is, therefore, a first problem that a composition not containing zinc oxide may be less resistant to hot air aging. Although the addition of an antioxidant to the composition may usually be effective for keeping it resistant to heat aging, it is a second problem that in the peroxide cure system the antioxidant may consume the peroxide cure agent and thereby hinder its vulcanization.

SUMMARY OF THE INVENTION

In view of the first and second problems stated above, it is an object of this invention to provide a peroxide cure system rubber composition comprising EPDM as a base material, which is zinc-free and yet highly resistant to heat aging.

In connection with the first problem, the inventors of this invention have paid attention to the iodine value of EPDM in a rubber composition. It is generally true that EPDM having a high iodine value gives a composition of low heat resistance. It is, therefore, usual to use EPDM having an iodine value not exceeding 8 in a peroxide cure system composition which does not require its rubber component to have a high degree of unsaturation.

The inventors have, however, found experimentally that EPDM having a high iodine value gives a composition which is greatly resistant to any lowering of its physical properties after hot air aging, even if it may not contain zinc oxide, though it may be somewhat inferior in its physical properties in ordinary state such as elongation and hardness due to a high degree of unsaturation. As a result, the inventors have found that a hose formed from any such composition has an improved resistance to cracking by heat aging. The inventors have also found that keeping the proportion of ethylene in a composition containing EPDM within a specific range has a favorable influence on the seal at joints of hoses, maintaining a low compression set at low temperatures.

In connection with the second problem, the inventors have found that the use of EPDM having a high iodine value makes it possible to reduce the action of any antioxidant against vulcanization considerably. Quinoline is the most preferable antioxidant to be used with a peroxide cure system EPDM composition.

According to a first aspect of this invention, there is provided a rubber composition comprising an ethylene-propylene-diene terpolymer (EPDM) as a base material and a peroxide type vulcanizing agent, in which the EPDM has an iodine value of 10 to 24 and an ethylene proportion of 48 to 60% by weight.

The rubber composition according to the first aspect of this invention gives a vulcanized product which is greatly resistant to any lowering of its physical properties by heat aging, since the EPDM which it contains has an iodine value of as high as 10 to 24, though it does not contain zinc. Firstly, the EPDM having a high iodine value makes it easy to obtain a zinc-free composition. The vulcanized product of the composition can be used to form any of various objects that may be exposed to an engine coolant without causing any problem with insoluble compounds of zinc. More specifically, it can be used to form, for example, the inner wall layer of a hose in a cooling system for an engine and thereby avoid any blocking of the hose or any leakage of the coolant through any seal associated therewith. Secondly, the EPDM having a high iodine value makes it possible to obtain a vulcanized product which is greatly resistant to any lowering of its physical properties, such as tensile strength (TB) and elongation at break (EB), by heat aging, though it may be somewhat inferior in these physical properties in ordinary state. The vulcanized product has a greatly improved flex life after heat aging. More specifically, the occurrence of cracking of a hose in a cooling system for an engine is greatly suppressed. The improvement is apparently due to a large number of crosslinks in the vulcanized product of a composition containing EPDM having a high iodine value.

As EPDM has an ethylene proportion of 48 to 60% by weight, the vulcanized product of the composition according to this aspect has a satisfactorily low compression set at low temperatures, so that a hose in a cooling system for an engine or the like can maintain a seal of improved tightness at its joint with a pipe.

According to a second aspect of this invention, the rubber composition further contains an antioxidant. The antioxidant improves the heat resistance of the vulcanized product of the composition. It can be added to the peroxide cure system composition without causing any appreciable harm, since EPDM having a high iodine value is effective for canceling out the action of the antioxidant against vulcanization considerably, as mentioned before.

According to a third aspect of this invention, the antioxidant is quinoline, or a combination of at least two antioxidants including quinoline.

When used alone as the antioxidant, quinoline is particularly effective for improving the heat resistance of the vulcanized product, and also hinders vulcanization still less, for some reason not known as yet.

According to a fourth aspect of this invention, the composition contains the antioxidant of the second or third aspect in an amount not exceeding 3 parts by weight per 100 parts by weight of EPDM. Any excess of the antioxidant is likely to result in its action against vulcanization which may not be negligible, even though the composition may contain EPDM having a high iodine value.

According to a fifth aspect of this invention, there is provided a hose formed from a rubber composition according to any of the first to fourth aspects of this invention, and used in a cooling system for an engine. The hose is of high heat resistance (particularly, high hot air aging resistance), and can maintain a tight seal at a joint, while having other advantages owing to the absence of zinc.

The above and other features and advantages of this invention will become more apparent from the following description and the accompanying drawing.

DETAILED DESCRIPTION OF THE INVENTION

Figure 1A:
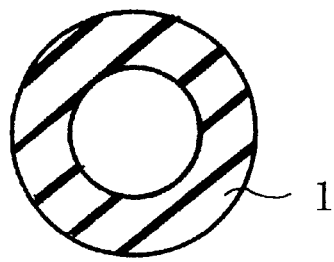
FIGS. 1A to 1G are each a cross sectional view of a hose embodying this invention.

Rubber Composition:

The rubber composition of this invention comprises as a base material EPDM having an appropriate iodine value and an appropriate ethylene proportion as stated above or below, and a peroxide type vulcanizing agent. It preferably contains also at least one antioxidant, and more preferably, at least quinoline. By "comprises EPDM as a base material" in this specification is meant that the composition comprises EPDM or a blend with EPDM as a main ingredient. The composition preferably does not contain zinc oxide, though it may.

EPDM:

The EPDM in the composition of this invention has an iodine value of 10 to 24 and an ethylene proportion of 48 to 60% by weight. There is no particular limitation except its iodine value and ethylene proportion. If its iodine value is smaller than 10, any problem caused by the absence of zinc is difficult to overcome, and a vulcanized product has its physical properties lowered greatly by heat aging. If its iodine value exceeds 24, the vulcanized product has physical properties in ordinary state which are so poor as not to be ignored. An ethylene proportion smaller than 48% by weight gives a product having an undesirably low tensile strength, and a proportion exceeding 60% by weight gives a product having an undesirably high compression set at a low temperature (say, −20° C.).

Peroxide Type Vulcanizing Agent:

The rubber composition of this invention is of the peroxide cure system. It may contain an appropriate amount of any commercially available peroxide type vulcanizing agent as required. Its preferred proportion is from 1.5 to 20 parts by weight per 100 parts by weight of EPDM. Examples of the commercially available peroxide type vulcanizing agents are PERHEXA 3M of NOF Corporation, which is 1,1-di-t-butylperoxy-3,3,5-trimethylcyclohexane, PERCUMYL D of the same company, which is dicumyl peroxide, and PEROXYMONE F of the same company, which is 1,3-bis-(t-butylperoxyisopropyl)benzene.

Antioxidant:

The rubber composition of this invention preferably contains at least one antioxidant, one of which is preferably quinoline, and still more preferably only one quinoline type antioxidant. NONFLEX RD of Seiko Chemical Co., Ltd. is a commercially available quinoline type antioxidant, though any other product can be used. The antioxidant is preferably employed in an amount not exceeding 3 parts by weight per 100 parts by weight of EPDM, since any excess thereof is likely to cause a problem as mentioned before.

Other Additives:

The rubber composition of this invention may further contain any other additive if it does not adversely affect the composition, or its advantages. Other additives may include carbon black, a white reinforcing agent, a vulcanization accelerator, process oil, a processing aid, and a reactive monomer.

Hose:

The hose of aspect 6 has a wall, or wall portion formed from a vulcanized product of any rubber composition according to aspects 1 to 4 of this invention, and is used in a cooling system for an engine of an automobile, or other vehicle, for example, between the engine and a radiator, or heater core. It has at least the inner layer of its wall formed from the vulcanized product of the composition according to this invention, and is not specifically limited in any other aspect of its structure.

Figure 1B:
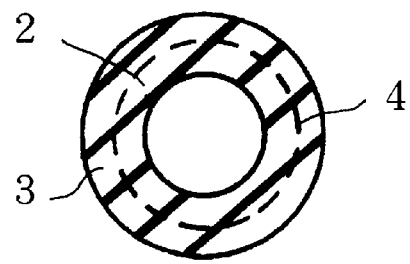
Figure 1C:
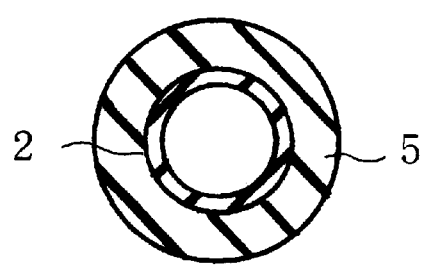
Figure 1D:
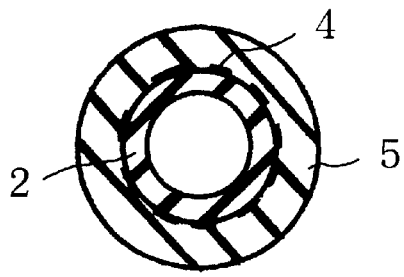
Figure 1E:
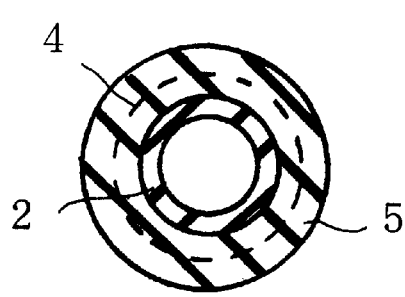
Figure 1F:
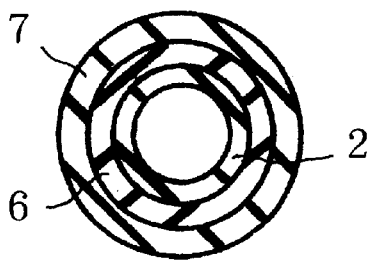
Figure 1G:
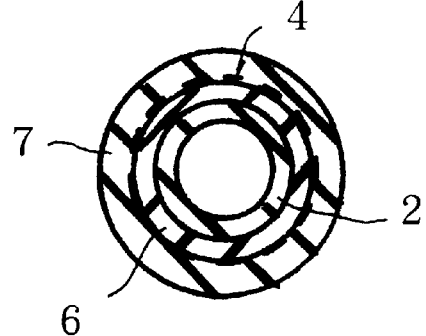

Typical forms of hoses embodying this invention are shown in FIGS. 1A to 1G. FIG. 1A shows a hose having a single-layered wall 1 formed from the rubber composition of this invention. FIG. 1B shows a hose having an inner wall layer 2 and an outer wall layer 3 both formed from the rubber composition of this invention, and a reinforcing yarn layer 4 held therebetween. FIG. 1C shows a hose having an inner wall layer 2 formed from the rubber composition of this invention and an outer wall layer 5 formed from another rubber material. FIG. 1D shows a hose similar to that shown in FIG. 1C, but further including. a reinforcing yarn layer 4 between its inner and outer wall layers 2 and 5. FIG. 1E shows a hose similar to that shown in FIG. 1C, but further including a reinforcing yarn layer 4 positioned through the middle of its outer wall layer 5. FIG. 1F shows a hose having an inner wall layer 2 formed from the rubber composition of this invention, an intermediate wall layer 6 formed from another rubber material, and an outer wall layer 7 formed from the rubber composition of this invention, or another rubber material. FIG. 1G shows a hose similar to that shown in FIG. 1F but further including a reinforcing yarn layer 4 between its intermediate and outer wall layers 6 and 7.

The invention will now be described in further detail by way of more specific examples.

EXAMPLE 1

Various peroxide cure system rubber compositions were prepared by employing different kinds of EPDM having different ethylene proportions and iodine values, and not adding any zinc oxide. A vulcanized testpiece was formed from each rubber composition, and evaluated for its physical properties in ordinary state, hot air aging resistance, compression set and flex life.

(Preparation of Rubber Compositions)

The rubber compositions shown at Nos. 1 to 7 in Table 1 were each prepared by mixing and kneading 100 parts by weight of EPDM or EPM having a different ethylene proportion and a different iodine value, one part by weight of stearic acid, 100 parts by weight of carbon black, 50 parts by weight of process oil and 4.2 parts by weight of an organic peroxide as a vulcanizing agent.

temperature of −20° C. for 22 hours, and was examined for its compression set (%). The results are shown in Table 1. A compression set below 50% is considered preferable.

(Evaluation of Flex Life, Cracking)

The flex life of a vulcanized product after heat aging is difficult to determine by the evaluation as described above, but is a very important property for such an object as a hose in a cooling system for an engine. Therefore, the vulcanized dumbbell testpiece prepared from each composition was tested by folding 180° after hot air aging as described above to see if the curved part would crack. A vulcanized single-

TABLE 1

| Composition No. | 1 | 2 | 3 | 4 | 5 | 6 | 7 | Desirable property |
|---|---|---|---|---|---|---|---|---|
| EPDM (or EPM) | E201 | E567 | E501A | E552 | E552/E512F | E512F | E5214 | |
| ML1 + 4 100° C. | 43 | 50 | 43 | | | | 35 | |
| 121° C. | | | | 83 | 74 | 65 | | |
| C2 proportion (wt. %) | 47 | 52 | 49 | 55 | 60.5 | 66 | 52 | |
| Iodine value | 0 | 5 | 12 | 12 | 12 | 12 | 23 | |
| Physical properties in ordinary state | | | | | | | | |
| TB (MPa) | 5.0 | 7.9 | 12.7 | 14.0 | 14.3 | 14.5 | 15.4 | 10< |
| EB (%) | 420 | 370 | 320 | 330 | 330 | 310 | 250 | 250< |
| Hardness $H_A$ | 65 | 68 | 69 | 69 | 71 | 71 | 72 | |
| Hot air aging resistance (150° C. × 360 h) | | | | | | | | |
| ΔTB (%) | −80 | −39 | −33 | −30 | −32 | −34 | −30 | |
| ΔEB (%) | −7 | −38 | −44 | −45 | −42 | −42 | −56 | |
| Δ$H_A$ | −3 | +3 | +5 | +5 | +4 | +6 | +8 | |
| Flex life | X | Δ | ○ | ○ | ◎ | ◎ | ◎ | No cracking, breakage |
| Compression set (−20° C. × 22 h) | 62 | 55 | 34 | 45 | 54 | 68 | 44 | 50> |
| Overall evaluation | X | X | ○ | ○ | Δ | X | Δ | |

In Table 1, E567, E501A, E552, E512F and E5214 are EPDM, while E201 is EPM. All of them were the products of Sumitomo Chemical Industrial Co., Ltd. Table 1 also shows the ethylene, or C2 proportion (% by weight) of each EPDM (or EPM) and its iodine value, as well as its Mooney viscosity (ML1+4 at 100° C. or 121° C.).

SEAST SO of Tokai Carbon Co., Ltd. was used as carbon black, DIANA PROCESS PW-380 of Idemitsu Kosan Co., Ltd. as process oil, and PEROXYMONE F-40 of NOF Corporation as the vulcanizing agent.

(Preparation of Testpieces and Evaluation for Physical Properties in Ordinary State)

A vulcanized rubber sheet having a thickness of 2 mm was prepared by vulcanizing each rubber composition at 170° C. for 20 minutes. A JIS 5 dumbbell testpiece was stamped out from each vulcanized rubber sheet. Each testpiece was evaluated for its tensile strength TB (MPa), its elongation at break, EB (%), and its hardness, HA in accordance with the JIS K 6251 procedures. The results are shown in Table 1. A TB value exceeding 10 MPa and an EB exceeding 250% are considered preferable.

(Physical Properties after Heat Aging)

A dumbbell testpiece prepared from each composition was subjected to 360 hours of heat aging at 150° C. Then, its TB, EB and HA were measured in accordance with the JIS K 6251 procedures, and compared with their initial values. The results of their comparison are shown as ΔTB (%), ΔEB (%) and AHA, respectively, in Table 1.

(Compression Set at Low Temperatures)

A testpiece was prepared from each rubber composition in accordance with the JIS K 6301 procedures, was held at a layered hose having an inside diameter of 26 mm and an outside diameter of 30 mm was formed from each composition. After its hot air aging done the same way as described above for the hot air aging of the dumbbell testpiece, a force was applied to the hose radially to compress it by half of its diameter to see if it would crack. The results are shown in Table 1 by symbols, i.e. an × indicating that both cracks and breakage occurred, a triangle indicating that cracks occurred, a circle indicating that a fine crack occurred, and a double circle indicating that neither cracks or breakage occurred.

(Overall Evaluation)

The results of the overall evaluation of each rubber composition for the foregoing items are shown in Table 1 by symbols, i.e. a circle indicating a very good composition, a triangle indicating a desirable one, and an × indicating an undesirable one.

EXAMPLE 2

Various rubber compositions shown at Nos. 8 to 13 in Table 2 were each prepared by adding one or two antioxidants to Composition No. 3 according to Example 1. The procedures in Example 1 were repeated for evaluating each composition.

TABLE 2

| Composition No. | 3 | 8 | 9 | 10 | 11 | 12 | 13 | Desirable property |
|---|---|---|---|---|---|---|---|---|
| Antioxidant | — | RD | ← | ← | MB | MB/RD | ← | |
| Type | — | Quinoline | ← | ← | Imidazole | Imidazole/Quinoline | ← | |
| Amount | — | 1 | 3 | 5 | 3 | 4/1 | 4/1 | |
| ZnO | — | — | — | — | — | — | ZnO | |
| Physical properties in ordinary state | | | | | | | | |
| TB (MPa) | 12.7 | 12.5 | 11.9 | 9.4 | 11.6 | 10.9 | 12.1 | 10< |
| EB (%) | 320 | 330 | 350 | 420 | 410 | 370 | 350 | 250< |
| Hardness $H_A$ | 69 | 70 | 69 | 66 | 68 | 69 | 68 | |
| Hot air aging resistance (150° C. × 360 h) | | | | | | | | |
| ΔTB (%) | −33 | −26 | −22 | −15 | −38 | −22 | −11 | |
| ΔEB (%) | −44 | −21 | −14 | −12 | −66 | −45 | −19 | |
| $ΔH_A$ | +5 | +2 | +2 | +2 | +4 | +5 | +10 | |
| Flex life | ○ | ◎ | ◎ | ◎ | Δ | Δ | ○ | No cracking, breakage |
| Compression set (−20° C. × 22 h) | 34 | 37 | 44 | 56 | 49 | 45 | 45 | 50> |
| Overall evaluation | ○ | ○ | ○ | X | X | X | ○ | |

In Table 2, the antioxidants employed are shown as RD or quinoline, MB or imidazole, and MB/RD or a mixture of imidazole and quinoline, and each arrow means that the same antioxidant or antioxidants as shown just to the left were employed. The amount employed of each antioxidant is shown in part or parts by weight per 100 parts by weight of EPDM, and 4/1 means four parts by weight of imidazole and one part by weight of quinoline. Composition No. 13 contained five parts by weight of zinc oxide per 100 parts by weight of EPDM, while no other composition contained any zinc oxide.

Example 1 was repeated for the evaluation of each of Compositions Nos. 8 to 13 including the preparation of testpieces, their evaluation for initial physical properties, hot air aging resistance, compression set at low temperatures, flex life, and their overall evaluation. The results are shown in Table 2.

While the invention has been described by way of its preferred embodiments, it is to be understood that variations or modifications may be easily made by those skilled in the art without departing from the scope of this invention which is defined by the appended claims.

What is claimed is:

1. A zinc-oxide-free rubber composition comprising an ethylene-propylene-diene terpolymer (EPDM) as a base material and a peroxide as a vulcanizing agent, said EPDM having an iodine value of 10 to 24 and an ethylene proportion of 48 to 60% by weight.

2. A composition as set forth in claim 1, wherein the content of said vulcanizing agent is 1.5 to 20 parts by weight per 100 parts by weight of said EPDM.

3. A composition as set forth in claim 1, wherein the vulcanizing agent is a member selected from the group consisting of 1,1-di-t-butylperoxy-3,3,5-trimethylcyclohexane, dicumyl peroxide, and 1,3-bis(t-butylperoxyisopropyl)benzene.

4. A composition as set forth in claim 1, further comprising an antioxidant.

5. A composition as set forth in claim 4, wherein the content of said antioxidant is not more than three parts by weight per 100 parts by weight of said EPDM.

6. A composition as set forth in claim 4, wherein said antioxidant is quinoline.

7. A composition as set forth in claim 4, wherein said antioxidant is a mixture of at least two substances, one of which is quinoline.

8. A composition as set forth in claim 1, further comprising at least one of the following: carbon black, a white reinforcing agent, a vulcanization accelerator, process oil, a processing aid and a reactive monomer.

9. A hose formed from a rubber composition as set forth in claim 1.

10. A hose as set forth in claim 9, which is a hose used in a cooling system for a vehicle.

11. A peroxide-vulcanized rubber composition comprising an ethylene-propylene-diene terpolymer (EPDM) as a base material, said EPDM having an iodine value of 10 to 24 and an ethylene proportion of 48 to 60% by weight, wherein the rubber composition does not form insolubles when directly exposed to engine coolant.

12. A vehicle cooling system comprising a hose as set forth in claim 9.

13. A rubber composition as set forth in claim 1, wherein the composition is cured.

* * * * *